(12) United States Patent
Menard et al.

(10) Patent No.: US 6,563,910 B2
(45) Date of Patent: May 13, 2003

(54) EMERGENCY RESPONSE INFORMATION DISTRIBUTION

(75) Inventors: Raymond J. Menard, Hastings, MN (US); Curtis E. Quady, Burnsville, MN (US)

(73) Assignee: Royal Thoughts, LLC, Minneapolis, MN (US)

( * ) Notice: Subject to any disclaimer, the term of this patent is extended or adjusted under 35 U.S.C. 154(b) by 219 days.

(21) Appl. No.: 09/793,373

(22) Filed: Feb. 26, 2001

(65) Prior Publication Data

US 2002/0118796 A1 Aug. 29, 2002

(51) Int. Cl.$^7$ .............................................. H04M 11/04
(52) U.S. Cl. ..................... 379/45; 379/90.01; 379/42; 455/404
(58) Field of Search .................. 379/37–51, 90.01; 455/404

(56) References Cited

U.S. PATENT DOCUMENTS

| | | | |
|---|---|---|---|
| 3,843,841 A | 10/1974 | Rubinstein | 179/5 P |
| 3,969,709 A | 7/1976 | Isaacs et al. | 340/224 |
| 4,237,344 A | 12/1980 | Moore | 179/2 A |
| 4,284,849 A | 8/1981 | Anderson et al. | 179/5 R |
| 4,303,801 A | 12/1981 | Anderson et al. | 179/5 R |
| 4,531,527 A | 7/1985 | Reinhold, Jr. et al. | 128/696 |
| 4,772,876 A | 9/1988 | Laud | 340/539 |
| 4,843,377 A | 6/1989 | Fuller et al. | 340/573 |
| 4,856,047 A | 8/1989 | Saunders | 379/57 |
| 4,908,600 A | 3/1990 | Martinez | 340/310 R |
| 4,993,059 A | 2/1991 | Smith et al. | 379/39 |
| 4,994,787 A | 2/1991 | Kratt et al. | 340/505 |
| 5,016,172 A | 5/1991 | Dessertine | 364/413.02 |
| 5,025,374 A | 6/1991 | Roizen et al. | 364/413.02 |
| 5,062,147 A | 10/1991 | Pickett et al. | 364/900 |
| 5,081,667 A | 1/1992 | Drori et al. | 379/59 |
| 5,128,979 A | 7/1992 | Reich et al. | 379/40 |
| 5,223,844 A | 6/1993 | Mansell et al. | 342/357 |
| 5,228,449 A | 7/1993 | Christ et al. | 128/691 |
| 5,276,728 A | 1/1994 | Pagliaroli et al. | 379/58 |
| 5,278,539 A | 1/1994 | Lauterbach et al. | 340/539 |
| 5,319,355 A | 6/1994 | Russek | 340/573 |
| 5,319,698 A | 6/1994 | Glidewell et al. | 379/39 |
| 5,351,235 A | 9/1994 | Lahtinen | 370/58.1 |
| 5,390,238 A | 2/1995 | Kirk et al. | 379/93 |
| 5,398,782 A | 3/1995 | Talbot et al. | 187/393 |
| 5,402,466 A | 3/1995 | Delahanty | 379/44 |
| 5,404,577 A | 4/1995 | Zuckerman et al. | 455/66 |

(List continued on next page.)

OTHER PUBLICATIONS

Skyroute Communications, http://www.sur–gard.com/sky-route.htm, pp. 1–4.

"21st Century Emergency Safety Communication Policy", ComCARE Alliance, http://www.comcare.org/21ct99.htm, 3 pages, (2000).

"AlarmNet–A Original Alarmnet", AlarmNet, http;//www.a-demco.com/AlarmNet/AlarmNetA.htm, pp. 1–2, (2000).

(List continued on next page.)

*Primary Examiner*—Wing Chan
(74) *Attorney, Agent, or Firm*—Schwegman, Lundberg, Woessner & Kluth, P.A.

(57) ABSTRACT

A system and method for providing networked communication using a public safety answering point. In one embodiment, networked communications include providing access to an encrypted website, or page, that is customized for a particular emergency or security event. The website is accessible using an Internet address. In one embodiment, access to the website is subject to access control, such as a password. The website, and password, is available to dispatch operators and emergency response personnel in the field. In one embodiment, a participant can request bidirectional communications with an operator or with a predetermined user.

33 Claims, 6 Drawing Sheets

U.S. PATENT DOCUMENTS

| | | |
|---|---|---|
| 5,412,372 A | 5/1995 | Parkhurst et al. ............ 340/568 |
| 5,416,695 A | 5/1995 | Stutman et al. ........ 364/413.02 |
| 5,432,841 A | 7/1995 | Rimer .......................... 379/59 |
| 5,451,839 A | 9/1995 | Rappaport et al. ........... 375/224 |
| 5,485,504 A | 1/1996 | Ohnsorge ..................... 379/58 |
| 5,486,812 A | 1/1996 | Todd ........................... 340/539 |
| 5,513,111 A | 4/1996 | Wortham ..................... 364/460 |
| 5,568,535 A | 10/1996 | Sheffer et al. ................. 379/39 |
| 5,570,083 A | 10/1996 | Johnson ....................... 340/692 |
| 5,583,831 A | 12/1996 | Churchill et al. ............. 368/10 |
| 5,587,701 A | 12/1996 | Hess ........................... 340/541 |
| 5,630,207 A | 5/1997 | Gitlin et al. ................ 455/54.1 |
| 5,652,564 A | 7/1997 | Winbush ..................... 340/426 |
| 5,687,215 A | 11/1997 | Timm et al. ................... 379/58 |
| 5,719,551 A | 2/1998 | Flick ........................... 340/426 |
| 5,736,932 A | 4/1998 | Bulfer et al. ........... 340/825.34 |
| 5,739,748 A | 4/1998 | Flick ........................... 340/426 |
| 5,752,976 A | 5/1998 | Duffin et al. ................. 607/32 |
| 5,777,551 A | 7/1998 | Hess ........................... 340/541 |
| 5,784,685 A | 7/1998 | Stanford et al. ........... 455/31.2 |
| 5,786,746 A | 7/1998 | Lombardo et al. ..... 340/286.04 |
| 5,793,283 A | 8/1998 | Davis ........................ 340/426 |
| 5,812,536 A | 9/1998 | Manduely ................... 370/282 |
| 5,815,417 A | 9/1998 | Orr et al. .................... 364/578 |
| 5,821,854 A | 10/1998 | Dorinski et al. ............ 340/539 |
| 5,825,283 A | 10/1998 | Camhi ........................ 340/438 |
| 5,845,203 A | 12/1998 | LaDue ........................ 455/414 |
| 5,850,180 A | 12/1998 | Hess ........................... 340/541 |
| 5,850,344 A | 12/1998 | Conkright .............. 364/479.01 |
| H1782 H | 2/1999 | Wicks et al. ........... 340/825.44 |
| 5,870,020 A | 2/1999 | Harrison, Jr. ............... 340/426 |
| 5,873,043 A | 2/1999 | Comer ....................... 455/458 |
| 5,874,889 A | 2/1999 | Higdon et al. .............. 340/426 |
| 5,892,442 A | 4/1999 | Ozery ........................ 340/539 |
| 5,898,391 A | 4/1999 | Jefferies et al. ............. 340/988 |
| 5,898,904 A | 4/1999 | Wang ........................ 455/31.3 |
| 5,902,234 A | 5/1999 | Webb ......................... 600/300 |
| 5,907,279 A | 5/1999 | Bruins et al. ............... 340/506 |
| 5,917,405 A | 6/1999 | Joao ........................... 340/426 |
| 5,933,080 A | 8/1999 | Nojima ....................... 340/539 |
| 5,959,529 A | 9/1999 | Kail ........................... 340/539 |
| 6,023,223 A | 2/2000 | Baxter, Jr. .................. 340/531 |
| 6,023,241 A | 2/2000 | Clapper ................. 342/357.13 |
| 6,028,514 A | 2/2000 | Lemelson et al. .......... 340/539 |
| 6,035,021 A | 3/2000 | Katz ....................... 379/93.12 |
| 6,057,758 A | 5/2000 | Dempsey et al. ........... 340/539 |
| 6,087,952 A | 7/2000 | Prabhakaran ............ 340/693.5 |
| 6,118,866 A | 9/2000 | Shtivelman ................. 379/309 |
| 6,442,241 B1 * | 8/2002 | Tsumpes ...................... 379/45 |

OTHER PUBLICATIONS

"AlarmNet–C Control Channel Cellular", AlarmNet, http://www.ademco.com/AlarmNet/AlarmNetC.htm, 2 pages, (2000).

"AlarmNet–M Mobitex System", AlarmNet, http://www.ademco.com/AlarmNet/AlarmNetM.htm, p. 1 (2000).

"allNetDevices:—Geoworks, Openware End Patent Fight", allNetDevices, http://www.devices.internet.com/icom_cgi/print/print.cgi?url=http://devices.internet.com/industry/ne . . . , 1 page, (2000).

"allNetDevices:—The Device–Centric Home in 2000: Close, But No Cigar", allNetDevices, http://www.devices.internet.com, 3 pages (2000).

"ARM7 Thumb Family", Arm Powered, Product Information, 4 p., (Prior to May 26, 200).

"ARM9 Thumb Family", Arm Ltd., Product Information, 6 pages, (Prior to May 26, 2000).

"Automatic Crash Notification", ComCARE Alliance, http://www.comcare.org/overview.htm, 2 pages, (2000).

"Blue–Connect", Acer NeWeb Corporation, Product Brief, 1 page, (Prior to May 26, 2000).

"Blue–Share", Acer NeWeb Corporation, Product Brief, 1 page, (Prior to May 26, 2000).

"Bluetooth—solutions for personal area networking", TDK Systems, Inc., Manufactures Brochure, 4 pages (Prior to May 26, 2000).

"Bluetooth Development using SDL, MSD and TTCN", Teleogic AB, Product Information, 13 pages, (Prior to May 26, 2000).

"Bluetooth Product Design—a natural progressionof our existing buiness", RTX, Manufactures Brochure, 4 pages, (Prior to May 26, 2000).

"Bluetooth White Paper", AU–System AB, Entire Pamphlet, (1999).

"Connect 24 Data Communications", Connect 24, http://www.connect24.com, 1 page (2001).

"CreataLink", Motorola, Inc., 2 pages (1999).

"CreataLink 2XT", Motorola, http://www.motorola.com/MIMS/MSPG/Products/OEM/calxt, 1 page, (Mar. 1999).

"CreataLink 2XT", Motorola Messaging Products, www.mot.com/MIMS/MSPG/Products/OEM/calxt/, 1 p., (Mar. 1999).

"Designing Solutions for the Internet Economy", Intel Developer Forum Spring 2000. Program Brochure, 2 pages, (Feb. 15–17, 2000).

"Digianswer Bluetooth—Development and Demonstration Tools", Digianswer A/S, Product Sheet, 6 pages, (Prior to May 26, 2000).

"Digianswer/Bluetooth Technology", Digianswer (IRl) Ltd., Product Inforamtion, 8 pages, (Prior to May 26, 2000).

"Emergency 911 Cellular Phone Accessories", AAA Communications, http://web.idirect.com/aaa/, 1–7 pages, (2001).

"Emergency Terms", Glossary, http://www.comcare.org/glossary.htm, 3 pages, (2000).

"Empowering the mobile enterprise", Puma Technology, Inc., Manufactures Brochure, 2 pages, (1996–1999).

"Emulation System Speeds Development of CDMA Satcom Handsets", Penton Publishing, inc., Product Information, 4 Pages, (1997).

"Enabling Innovation", Arm Ltd., Product Brochure, 10 Pages, (1999).

"Get a better vantage point and outmaneuver the competition", Cadence Design Systems, Inc., Manufactures Brochure, 2 pages, (1999).

"Introduction to the HomeRF Technical Specification", HomeRF, pp. 1–17, (2000).

"IVT—Bluetooth Protocol Stack SDL/C Source Code", Bluthtooth, Product Brochure, 2 pages, (Prior to May 26, 2000).

"Lucent Technologies and Bluetooth", Lucent Technologies, Inc., Manufactures Brochure, 2 pages, (Dec. 1999).

"ObjectGEODE—The Most Advanced Integrated Enviornment for the Development of Distributed Real–time Systems", Verilog S.A., Entire Brochure, (1998).

"ORA Electronics Introduces Rescue Mate, a Complete Cellular Telephone Safety Package; Hands–Free Operation, Instant Emergency 911 Access, Roadside Assistant Services", Business Wire, http://www.findarticles.com, 2 pages, (1998).

"OSE—the new generation realtime operating system", ENA OSE Systems, Informational Brochure, Entire booklet, (1999).

"PSAP Updates and Third–Party Call Centers", ComCARE Alliance, http://www.comcare.org/psap.htm, 2 pages, (2000).

"Samsung Electronics joins home radio frequency group in development of wireless network for the home", Samsung Electronics, http://www.samsung.com/news/samsung/1998/sea0305.html, pp. 1–2, (1998).

"Socket's Bluetooth Cordless Communications Card FAQ", Socket Communications, Inc., Informational Literature, 2 pages, (Dec. 1999).

"Spontaneous Connections", CommVerg, 6 pages, (May 2000).

"Tachless Remote Engine Starters", Almex, http://www.almexltd.com/iei/mantis1200.htm, pp. 1–3, (2000).

"Technology Solutions for Bluetooth from Ericsson Microelectronics", Erricson Components AB, Manufactures Brochure, 2 pages, (Nov. 1999).

"The Ericsson Bluetooth Development Kit—Faster launching of Bluetooth Products", Ericsson Mobile Communications, AB, Manufactures Brochure, 2 pages, (1999).

"The Secret of Sucess!", SIGnal Newsletter—The Official Newsletter of the Bluetooth Special Interest Group, Issue No. 3, 8 Pages, (Nov. 1999).

"UMTS W–DCMA Technology Development Using the Aptix System Explorer MP4 for Algorithm Verification", Aptix Corporation, Product Information, 4 Pages, (1999).

"Unleash the World—Core technology for Bluetooth applications", Ericsson Mobile Communications AB, Manufactures Brochure, 8 pages, (1999).

"Will the push—not pull—of Internet information dramatically alter out Web interactions", Sunworld, http://www.sunworld.com, 6 pages, (2000).

"Wireless Connections Made Easy", Bluetooth, Manufactures Brochure, 19 Pages, (Prior to May 26, 200).

"Your Vision—Our Solution", RTX Telecom, Manufactures Brochure, 6 pages, (Prior to May 26, 200).

Houston, J., "Socket Teams with Cambridge Silicon Radio for Bluetooth Cordless Networking on Windows CE", Socket Communications, Inc., Press Release, 2 pages, (1999).

Nobel, C., "Microsoft jumps on the Bluetooth bandwagon", *PC Week,* 1 page, (Dec. 6, 1999).

Posti, J., "Motorola Introduces CreataLink 2 XT ReFLEX Two–way Data Transceiver for Wireless Communications", Motorola Press Release, www.mot.com/MIMS/MSPG/Press/PRI9990303_21575.html, 2 p., (Mar. 1999).

* cited by examiner

ADDRESS http://XXXXXXXXXXXXXX ~205

EVENT CODE [ ] ~210

STREET ADDRESS [ ] ~215

ACCOUNT NUMBER [ ] ~220

ACCOUNT NAME [ ] ~225

SERVICE ZONE [ ] ~230

TIME [ ] ~235   DATE [ ] ~240

MEDICAL [ ] ~245

FIRE [ ] ~250

POLICE [ ] ~255

OTHER [ ] ~260

REMARKS [ ] ~265

| REQUEST COMMUNICATIONS (CLICK HERE) ~270 | LEVY FALSE ALARM FINE (CLICK HERE) ~280 | EDIT DATA FIELDS (CLICK HERE) ~290 |
| VIEW ARCHIVAL DATA (CLICK HERE) ~275 | VIEW MAP (CLICK HERE) ~285 | MATTER DISPOSITION (CLICK HERE) ~295 |

Fig. 3

EMERGENCY RESPONSE INFORMATION DISTRIBUTION

TECHNICAL FIELD OF THE INVENTION

The present invention relates generally to the field of communications and in particular, to a network-based emergency, or security, response communication system.

BACKGROUND

Many homes and businesses are equipped with security systems. A typical security system includes a variety of sensors coupled to a control panel. The sensors may be electromechanical devices that generate an electrical signal to indicate the occurrence of a particular condition. The control panel often includes programming and circuitry to sound an audible alarm as well as contact a central monitoring service. The control panel may seize the telephone line at the building and place a telephone call or it may transmit a wireless message using a radio communication channel.

In many cases, the central monitoring service operator includes a human operator. Upon receiving the alarm signal, the central monitoring service operator interprets the data and contacts an operator at a public safety answering point (hereinafter "PSAP"). The central monitoring service operator, in turn, then relays the information received with the alarm signal to a PSAP operator. The PSAP operator further evaluates the information received from the central monitoring service operator and dispatches the appropriate emergency response personnel to the site.

The PSAP operator may also receive live calls on an emergency telephone number, such as 9-1-1 for many communities. As with calls received from a central monitoring service, the PSAP operator evaluates the situation presented by the caller and dispatches the appropriate emergency response personnel to the site.

In addition to receiving incoming calls, the PSAP operator may also be responsible for originating outgoing calls in order to dispatch emergency services. The PSAP operator may dispatch emergency aid by placing a telephone call or by using a wireless communication link. The operator placing the call verbally communicates the information to enable a field unit to respond. The field unit, or responding party, then renders aid based on the information received from the PSAP operator or dispatch service.

At some PSAP facilities, the PSAP operator receives the incoming emergency calls and conveys the emergency data to a second operator who then provides dispatch services.

Within the context of a security system, the central monitoring station, or remote monitoring facility, is typically a subscription, or fee-based, commercial service providing around-the-clock monitoring of a security system. In addition to monitoring security systems for alarms, the central station also may engage in verification, or authentication, of an emergency signal by attempting to place a telephone call to an authorized person, which may be the homeowner. If the attempt to call the authorized person is successful, the central station may request the homeowner to verify the alarm signal. After the emergency call has been verified, the central station may then place a call to the PSAP facility which provides dispatch service.

Numerous problems accompany the system described above. For example, the responding unit (i.e., squad car personnel, ambulance personnel, or fire department personnel) may not receive all information concerning the particular emergency event. Data may be lost, or corrupted, anywhere along the communication path between the central station and the field response unit. The classic children's game known as "telephone" epitomizes the problems associated with repeated human intervention in the transmission of data. Each successive person in the chain of communication may unwittingly introduce errors or omit critical data. The absence of recognized standards for communicating emergency response data appears to aggravate the communication problem.

Another problem with the current system is that the data may be obsolete at a time when the responding unit arrives at the scene. For example, a robber may have left the scene by the time police arrive at a home and yet the security alarm signal indicates that an intruder remains at the premises. Emergency services, once dispatched, can rarely be withdrawn. Similarly, responding units seldom have the capacity to receive updated status information regarding an emergency situation once a dispatch has been ordered. Thus, obsolete or erroneous data may present safety hazards for field personnel or it may jeopardize the adequacy of the emergency response.

Previous efforts to address problems with the present system have been unsatisfactory. For example, enhanced 9-1-1 ("E-911") service automatically provides a call back number and geographic location of the caller. The location information may be used to provide call routing to the nearest PSAP. E-911 does not address the problems inherent in a serialized communication stream of data from the caller, to the PSAP operator, and eventually, to the response team. Consequently, E-911, like traditional 9-1-1 service, may encounter problems such as lost, corrupt and incomplete data.

For these and other reasons, the present system of communicating emergency and security information using a PSAP is inadequate.

SUMMARY

The above-mentioned problems with PSAP communication systems, and other problems, are addressed by the present invention and will be understood by reading and studying the following specification. A system is described for network communications using a network address. Data concerning an emergency event detected by a security system, or received in a 9-1-1 telephone call, is posted as a database on the network using an assigned network address. Service providers, dispatchers, and other authorized users can access the database using the network address. In one embodiment, the network is the world wide web, or Internet and the address corresponds to a URL. In one embodiment, the database is encrypted to minimize or eliminate tampering by unauthorized users. Encryption also enables authentication of the data entered. In one embodiment, access to the database, or collection of information is restricted by access control. Access control may include a program executing on a processor or hardware that limits access to only those users having authorization to access the information. Other methods of restricting access, other than those involving encryption, are also contemplated. For example, the data may be accessible using socket communications, thus preventing (or reducing) tampering and unauthorized viewing.

Service providers can access the database using the network address and a decryption key, or password. In one embodiment, service providers, and others, access the database using a processor executing software. In one embodiment, the software is a network browser, such as, for example, Netscape Navigator™ (Netscape Communications Corporation, Mountain View, Calif.) or Microsoft Internet Explorer™ (Microsoft Corporation, Redmond, Wash.).

In various embodiments, an assortment of user selectable buttons are presented to the network user. One such button enables a service provider to request bidirectional communications with an authorized person, such as, for example, a residential owner or tenant. One embodiment provides that actuation of a button submits a request to monitor audio or video from a particular communication device, preferably located near, or at the site of the sensor that initiated communications with the PSAP facility. One such button enables a service provider to levy a fee against a particular financial account, such as, for example, a monetary fine for a false alarm. One such button enables a service provider to automatically send a query to an authorized person, or a particular communication device, requesting that the truth or falsity of the detected alarm is verified. One such button allows linking to an auxiliary page, or pages, of data related to the subscriber account, the caller's telephone number or identity, or a street address. One such button enables a moving map function whereby movement of a tracking device is displayed in relation to a geographic map.

Other functions and features are contemplated using a network-based database, optionally encrypted, for the benefit of reliably providing emergency data to service providers. Accuracy of the data is enhanced since the data is not manually entered into a system multiple times. The data is nearly instantaneously available to all authorized users on the network. Real time data allows for dynamically updating of the database, for example with a tracking device. Interactivity with an authorized person or communication device also facilitates a more efficient responses since data can be readily exchanged. Ready access to archival data and account data further enhance the response efficiency. For example, response performance can be evaluated more efficiently and changes implemented with greater confidence of efficiency. A fee for a false alarm can be efficiently assessed.

In one embodiment, the information received by the PSAP is communicated to authorized recipients using a multicast communication protocol. Multicasting efficiently distributes a common message to a predetermined number of recipients using a network.

In sum, it is believed that the present system and method hold promise for improving the response time and efficiency during the brief time period immediately following an emergency event, often referred to as the "golden hour." Improved emergency response performance during this time period may reduce property losses and human suffering.

BRIEF DESCRIPTION OF THE DRAWINGS

FIG. 3 illustrates a view of a portion of a database operable with the present system.

DETAILED DESCRIPTION

The following detailed description refers to the accompanying drawings which form a part of the specification. The drawings show, and the detailed description describes, by way of illustration, specific illustrative embodiments in which the invention may be practiced. These embodiments are described in sufficient detail to enable those skilled in the art to practice the invention. Other embodiments may be used and logical, mechanical, and electrical changes may be made without departing from the scope of the present invention. The following detailed description is, therefore, not to be taken in a limiting sense.

Figure 1:
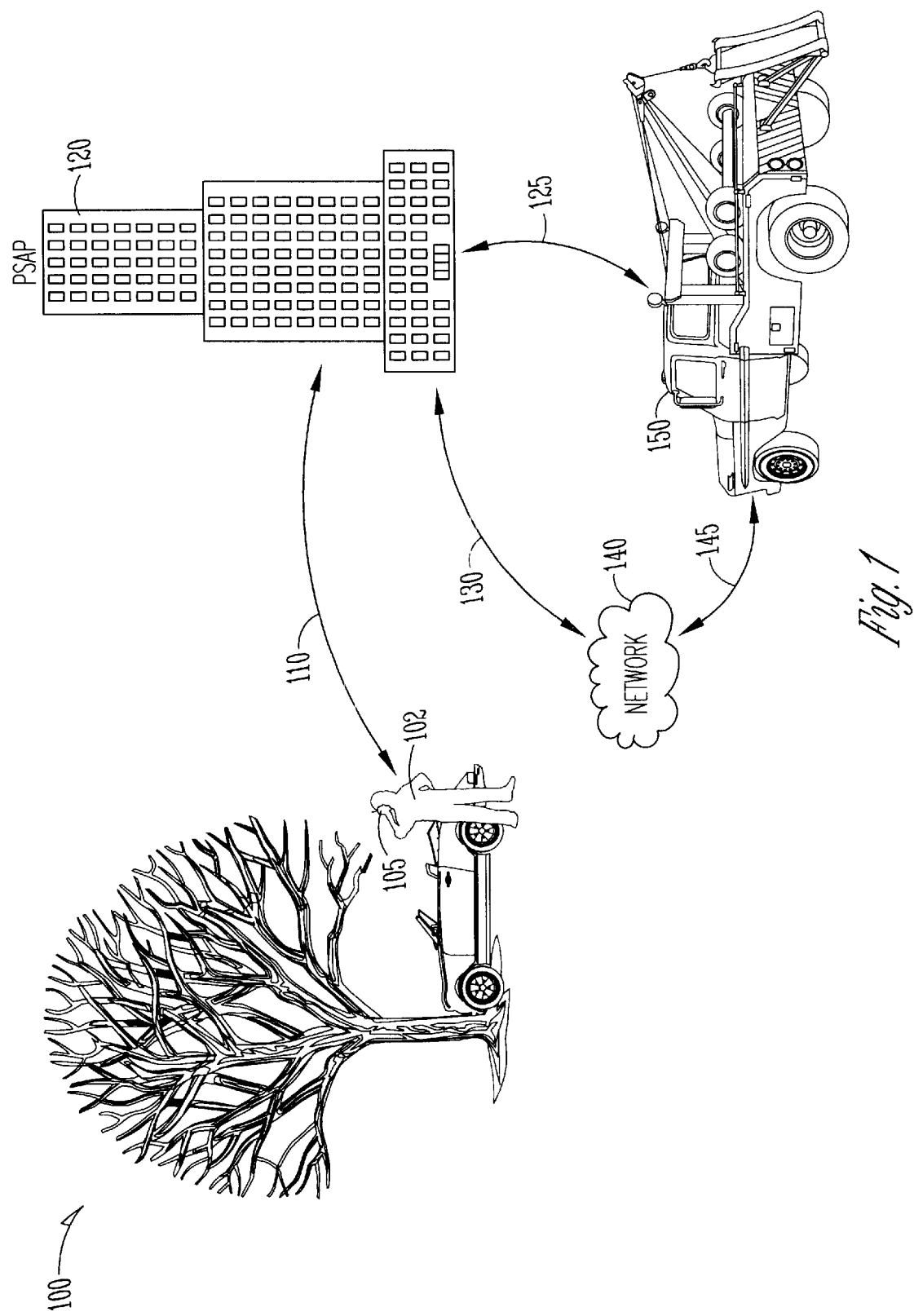
FIG. 1 illustrates one embodiment of a system according to the present subject matter wherein a caller establishes contact with a PSAP.

FIG. 1 illustrates one embodiment of a system according to the present subject matter, herein denoted in the figure as system 100. In one embodiment, the system is embodied in software, firmware or hardware adapted to implement particular functions as described herein. In FIG. 1, caller 102 in an emergency situation is shown engaged in a communication session with PSAP 120. Caller 102 in the figure is shown operating cellular telephone 105 and the communications with PSAP 120 are conducted on communication link 110. In most cases, caller 102 will contact PSAP 120 by dialing an emergency response telephone number, which, in one embodiment, is telephone number 9-1-1. Other emergency access numbers may be used. Typically, telephone calls placed to 9-1-1 are automatically routed to a nearby PSAP facility. In some municipalities, the 9-1-1 service may also automatically provide the PSAP facility with a call back telephone number or automatic location information.

In accordance with one embodiment of the present subject matter, information from caller 102 is received, at PSAP 120, by a human telecommunications operator or by a processor suitably programmed to receive audible data. The information received from caller 102 is encoded in a database. The database includes such information as may be used in formulating a suitable response to the emergency situation presented by caller 102. For example, in one embodiment, the database includes the caller's name, telephone number, location of the emergency situation, the type of emergency assistance requested, and when appropriate, the number of injured people.

In one embodiment, the database is posted as a document on the Internet. In one embodiment, the database is formatted as a web page and is accessible using the world wide web. In one embodiment, the address of a web page is a URL (Uniform Resource Locator). In one embodiment, the database is formatted in HTML (HyperText Markup Language). In one embodiment, one or more embedded links provide access to one or more other linked documents. Linked documents may include additional information corresponding to the emergency event, caller 102, or other people or places. For example, in one embodiment, a linked document provides medical information or health history information, received from a treating facility, for a particular person.

The database, or collection of information, may be created by various methods. For example, in one embodiment, emergency information is used to create a web page in real time. In one embodiment, a separate web page is created for each emergency. In one embodiment, a central repository of data is created and the web page includes links to the various elements within the database. Other methods of creating a web page are also contemplated.

In FIG. 1, PSAP 120 posts the database on network 140 using link 130. In one embodiment, link 130 is a connection to the Internet via an ISP (Internet Service Provider), an online service (such as America Online) or by other means of accessing the Internet.

In one embodiment, network 140 is a communication network with broad-based accessibility and allowing for the exchange of data. In one embodiment, access to network 140 is by a wired or wireless device. Network 140 permits multiple simultaneous users and allows for data entry and data retrieval. In one embodiment, network 140 is the Internet. The database posted on network 140 may exist on a server located at PSAP 120 or on a server or in memory located at another location unrelated to the emergency event. In the figure, network 140 is illustrated in a cloud-like manner to graphically illustrate the distributed nature of network 140.

In FIG. 1, service provider 150 accesses network 140 using wireless link 145. Service provider 150 is illustrated here as a tow truck. In one embodiment, service provider 150 is any of a number of other types of emergency service providers. For example, in various embodiments, service provider 150 is an ambulance, a paramedic unit, a rescue helicopter, a police squad car, a fire truck, or a paramedic or emergency response unit. In one embodiment, service provider 150 includes a wearable computer or Internet appliance.

Wireless link 145 enables service provider 150 to access the database on network 140. In one embodiment, service provider 150 includes a wireless Internet communication device. Examples of wireless devices include, Palm™ VII personal data assistant (Palm, Inc., Santa Clara, Calif.) and Handspring Visor™ personal data assistant (Handspring Inc., Mountain View, Calif.) and others.

In the figure, link 125 provides a communication channel between service provider 150 and PSAP 120. In one embodiment, PSAP 120 provides notification to service provider 120, via link 125, that an emergency event has occurred. In one embodiment, link 125 includes network 140. In one embodiment, link 125 includes a communication channel independent of network 140. In various embodiments, link 120 includes an e-mail correspondence, a wireless communication message, a web communication link, a wired communication link (such as a telephone), or other communication link. Link 125 also provides the communication channel by which service provider 150 receives the network address for the database associated with a particular emergency event. In one embodiment, network 140 employs "pull" technology, in which case, link 125 provides notification to service provider 150 that data is available for pulling, or downloading, from the network. In one embodiment, network 140 employs "push" technology, in which case, data posted by PSAP 120 is sent to service provider 150 without service provider 150 first submitting a request for data. In one embodiment, the data is pushed to service provider 150 periodically, sporadically, or on an as needed basis.

Link 125 also represents a communication channel by which PSAP 120 and service provider 150 exchange a key, or password, for use in a secure communication system. A secure communication system can be advantageous for a number of reasons. First, a secure system provides a measure of protection against unauthorized eavesdropping. Eavesdropping may be problematic in criminal matters, for example, where police forces are attempting to implement a swift response to a crime in process. Second, a secure system provides a measure of protection against tampering of information during transit. Tampering, like eavesdropping, may be problematic in criminal matters. Third, a secure system provides protection against one party impersonating the identity of another. Other attributes of a secure system include heightened privacy, improved authentication of communications, and improved protection against later repudiation.

In one embodiment, communications using network 140 includes exchanging encrypted data using an encryption system, such as, for example but not by way of limitation, symmetric-key encryption or asymmetric-key encryption. In most symmetric-key encryption systems, both parties to a communicated message employ the same password, or key. The security of such a system requires that the key remain secret from outsiders. In one embodiment of the present system, the key is known by PSAP 120 and by service provider 150.

Asymmetric-key encryption, sometimes referred to as public-key encryption, on the other hand, employs both a public key and a private key. The public key is widely distributed, or published, and the private key remains secret. Data encrypted with a public key can be decrypted only with a corresponding private key. For example, in one embodiment of the present system, PSAP 120 uses the public key of a particular service provider 150 to encrypt data for receipt by the particular service provider 150. Service provider 150 decrypts the data using their private key and then provides services accordingly.

Combinations of symmetric-key and asymmetric-key encryption systems are also possible and within the scope of the present system. For example, in one embodiment, several service providers 150 share a common public key and thus each can enjoy access to data posted on network 140 by PSAP 120. Other combinations and permutations of encryption systems are also contemplated.

Multicasting using network 140 entails multiple receivers for a single message. In one embodiment, PSAP 120 transmits a multicast message, having content corresponding to the database generated upon receiving the emergency signal, for receipt by multiple service providers. For example, in one embodiment, the multicast message, or datagram, includes a request for assistance from police, fire and medical emergency service providers. In each case, the responding service providers can access the database posted by PSAP 120. In one embodiment, more potential service providers can access and review portions of the data posted by PSAP 120 than actually provide emergency services. In one embodiment, multicasting is in accordance with IP Multicasting standards (such as the Internet Multicast Backbone, MBONE) or in accordance with other generally accepted protocols.

The emergency scenario, communication links, and aid facilities shown in FIG. 1 are illustrative but not limiting. For example, in one embodiment, rather than a cellular telephone, caller 102 uses a wired connection and a conventional telephone to contact PSAP 120. As another example, in one embodiment, caller 102 uses a radio to contact PSAP 120. Other means of communicating with PSAP 120 are also contemplated. In addition, multiple PSAP facilities, or emergency response centers, may participate in the communication system. For example, in one embodiment, a state trooper headquarters can receive an emergency telephone call and post data using network 140 for access by emergency response service providers 150.

Figure 2:
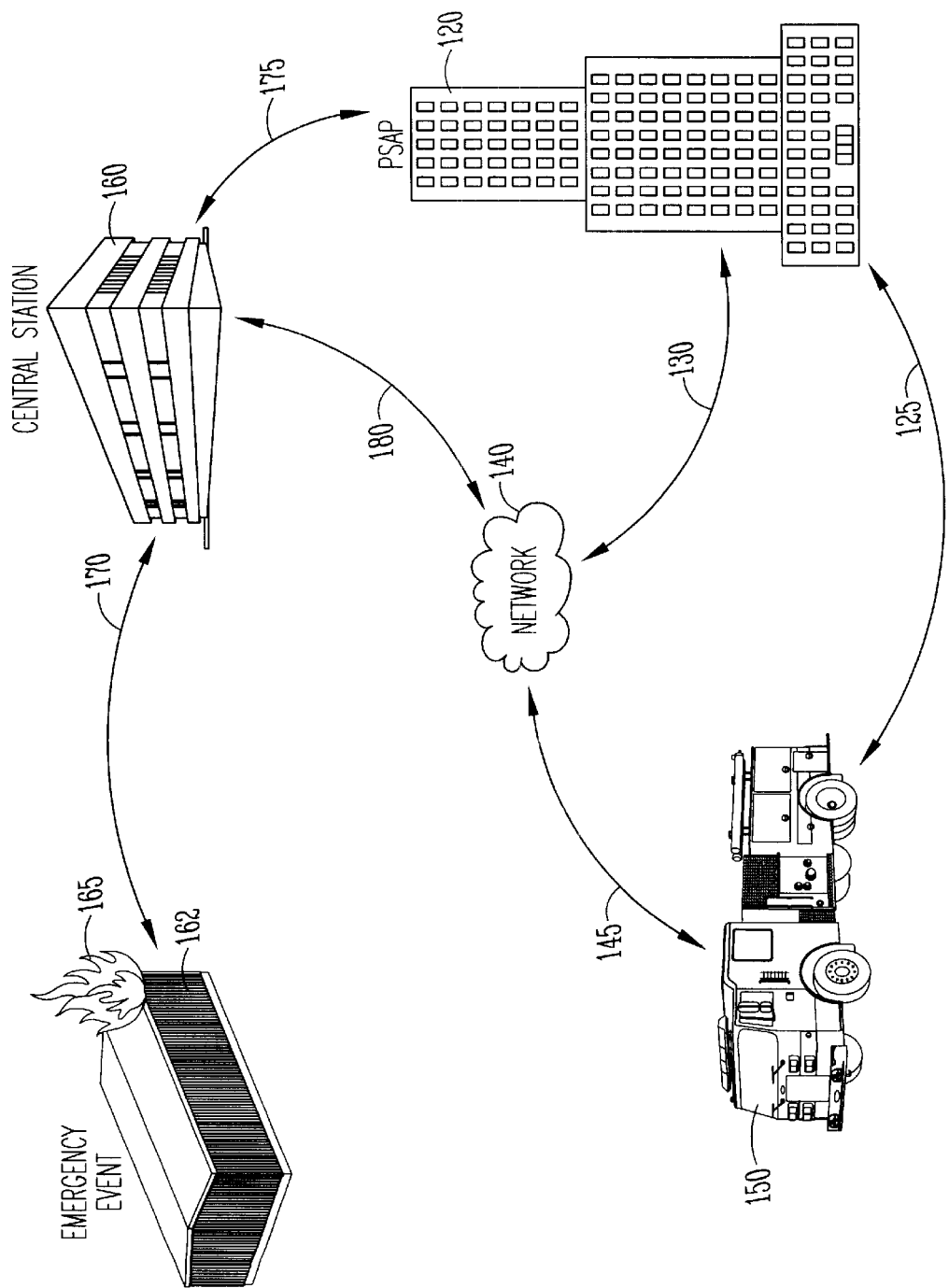
FIG. 2 illustrates one embodiment of the present system wherein an emergency event communicates a signal to a central station.

FIG. 2 illustrates another embodiment of system 100. In the figure, emergency event 165 is detected and an electrical signal is communicated to central station 160 via link 170. Here, the figure shows emergency event 165 as a fire at building 162. A suitable sensor is coupled to link 170 at building 162. In various embodiments, the sensor is a smoke detector, a fire detector, a temperature detector, an intrusion detector, an infrared detector, a motion detector, a door contact switch, a glass breakage detector or any of a number of other sensors operable with a security system.

Central station 160 receives notification of the detected event, here, illustrated as emergency event 165. Typically, a residential or commercial security system includes detectors and an alarm. Often, security systems include a telephone or wireless connection to a central station or monitoring service. The central station includes one or more telecommunication operators that monitor incoming alarm signals from sensors and detectors installed at a subscriber facility, herein shown as building 162. In one embodiment, the subscribers' facility is a residential dwelling, commercial office space or other property or place.

The alarm signal is transmitted from the monitored property to central station 160, on link 170. In various embodiments, link 170 includes a wired or wireless communication channel. At central station 160, a telecommunication operator is notified upon receiving the signal indicating detection of emergency event 165. The telecommunication operator, having access to account information associated with monitored property 162, typically will make a determination, based on the nature of the incoming call and the available account information, as to the validity of the received alarm signal. For example, in one embodiment, the telecommunication operator can attempt to establish telephone contact with the homeowner, building owner, or other designated person to determine if the received signal is truly or falsely indicating an emergency. If the telecommunication operator is unable to establish that the received signal is a false alarm, or is falsely indicating an emergency, then the telecommunication operator posts a database on network 140 using link 180. In various embodiments, link 180 includes an ISP, an online service or other connection to network 140. In various embodiments, the database corresponding to the detected emergency event, includes, but is not limited to, data fields such as street address, time of day, nature of emergency, telephone call back number, priority code, event code, or other such fields. In one embodiment, the telecommunication operator posts the database using a processor executing suitable software. In one embodiment, the database is posted on the Internet or world wide web. In one embodiment, the database is encrypted to prevent unauthorized tampering, authentication, and privacy. The telecommunication operator may be replaced, or augmented, by an automatic dispatch system.

Using link 175, central station 160 communicates with PSAP 120. In various embodiments, link 175 includes an e-mail correspondence, a wireless communication message, a web communication link, a wired communication link (such as a telephone), or other communication link. In various embodiments, link 175 includes communicating using network 140 or a communication channel independent of network 140. In one embodiment, link 175 is used to communicate a password, or key, between PSAP 120 and central station 160. Link 175 may include the exchange of data using various protocols, including, for example but not by way of limitation, extensible markup language (XML), Hypertext markup language (HTML), wireless markup language (WML), a socket connection, e-mail, including simple mail transfer protocol (SMTP), Transmission Control Protocol/Internet Protocol (TCP/IP) or other communication protocol.

PSAP 120 is coupled to network 140 by a network connection, which, in various embodiments, includes an ISP, an online service, or other connection, by link 130. In one embodiment, PSAP 120 uses a browser operating on a processor to access the database on network 140. A password, or key, held by PSAP 120, permits an encrypted database to be accessed.

PSAP 120, in turn, provides dispatch services in response to emergency event 165. In one embodiment, an operator at PSAP 120 evaluates the contents of the database and determines a suitable response. In one embodiment, a processor, executing suitable programming, access the database on network 140 using link 130, and determines a suitable response. PSAP 120 then contacts responding unit 150 and grants access rights to the database on network 140. In one embodiment, granting access includes providing the web address and access key, or password, to the responding unit. In the figure, responding unit 150 receives communications, from PSAP 120, on link 125. In various embodiments, link 125 includes communicating using network 140 or a communication channel independent of network 140. Here, responding unit 150 is illustrated as a fire truck. Responding unit 150 is equipped with hardware and software to enable accessing network 140. Responding unit 150, with password and network address, then are able to access the database and receive information to assist in responding to emergency event 165.

The database posted on network 140 may exist on a server located at PSAP 120, at a server or memory located at central monitor station 160, or on a server or in memory located at another location unrelated to the emergency event.

Other implementations of system 100 are also contemplated. For example, in one embodiment, a vehicle is equipped with global positioning system (GPS) receiver and a digital data transmitter, and a vehicle theft detector. In one mode of operation, the theft detector senses unauthorized movement of the vehicle and transmits an electronic signal indicating such theft. The wireless signal is received by a central station as previously described. In one embodiment, the wireless signal received by the central station is interpreted by a processor or by a human telecommunications operator. The GPS receiver, in conjunction with the wireless transceiver, provides positional information concerning the vehicle to the central station. As previously described, the central station posts a database concerning the detected event, and in this example, that is, a vehicle theft. When the vehicle is in motion, position data from the GPS receiver provides a stream of real time data corresponding to the movement of the vehicle. The movement of the vehicle can thus be tracked using a moving map display as part of the database posted on network 140. In one embodiment, the movement of the vehicle is depicted on a moving map as a traveling icon. The scale, view, and orientation of the traveling icon (corresponding to movement of the vehicle), relative to the map display, are user selectable via buttons from a browser coupled to the web site on the Internet. Consequently, emergency response personnel, for example in a police squad car, can access the database posted on the web and monitor, in real time, the movement of the stolen vehicle. The foregoing example concerning a stolen vehicle is offered by way of example only, and is not to be construed as a limitation of the present subject matter. In one embodiment, movement of a vehicle, as depicted by the present system, provides information about movement of a person or other object, such as, for example a suitcase of money, within the vehicle. In one embodiment, movements of an object can be monitored. By way of example, in various embodiments, automobiles, aircraft with transponder generated-web page, water craft, and objects can be monitored. In one embodiment, the transponder transmissions from an aircraft are translated to a web site for which a password or key is used to gain access to the web site. Authorities can thus monitor location of moving objects or persons.

In addition to monitoring functions using a website, one embodiment provides a level of remote control also using a website. In one embodiment, a transceiver coupled to an actuator, or other device, can be controlled from a website using the present system. For example, a police officer pursuing a stolen vehicle can transmit a command, using the website, to disable the vehicle. An electromechanical actuator coupled to a wireless transceiver may terminate the fuel flow, unpower the engine ignition system, or disable (or enable) any other system in the vehicle. As another example, the website may allow a fire or medical rescue person using a browser to remotely unlock an entry door to allow access to the premises. Other systems that may be controllable through a website include heating, ventilating and air conditioning (HVAC) equipment, an elevator in a building, door locks on a car or building, or other such devices or systems.

FIG. 3 illustrates a portion of a database 200 according to one embodiment of the present subject matter. In the figure, database 200 is accessible at a website having a URL as indicated in the address field 205. In one embodiment, database 200 is implemented in Hypertext Markup Language (HTML). In various embodiments, some, or all of the fields herein are displayed to a responding facility. In addition, some or all of the fields can be edited by a responding, or authorized, facility. Editing includes initial entry of data as well as deletion of any previously entered data. In one embodiment, data is entered, or edited, using a standard keyboard, voice recognition software, look-up tables, templates, or other means of data entry.

Upon receipt of the electrical signal from a sensor at the emergency event 165 (in FIG. 2) or the request for emergency assistance from caller 102 (in FIG. 1), central station 160, or PSAP 120 assigns event code 210 corresponding to the particular emergency event. In one embodiment, data in field 210 is manually or automatically generated and inserted into database 200. In an embodiment where the emergency event can be associated with a fixed street address (such as for example, a fire, a robbery, or an unauthorized intrusion), or otherwise where relevant, the street address is manually inserted into database 200 at field 215 or automatically determined. In the case of a central station monitoring security of a subscriber premises, one embodiment provides that account information appears in field 220. In addition, the name of a contact person for the account (which, in various embodiments, includes a homeowner or other person having control over the premises), as well as the telephone and other contact information, for the person, is provided in field 225. In field 230, the service zone is entered manually, calculated, or otherwise entered. The service zone, in one embodiment, relates to the portion of a monitored area for which the emergency event 165 is occurring. In one embodiment, the service zone relates to the geographical region of a particular jurisdiction and is associated with a zone of coverage for a particular rescue or emergency response provider. Fields marked time 235 and date 240 relate to the time and date of the event giving rise to the emergency event 165. Fields 245, 250, 255 and 260, labeled herein as medical, fire, police and other, respectively, are selected manually or automatically by the telecommunications operator at the central station 160, PSAP 120, or by other means. In one embodiment, remarks 265 is a note field for entering textual data that may not be suitable for the database fields otherwise provided.

In the embodiment shown, a series of selectable buttons, or options, are included in database 200. Some, none or all of the various buttons described herein are operable, or appear, in the display of the database presented to field response personnel. For example, in one embodiment, request communication button 270 is available in particular emergency situations. In one embodiment, field response personnel, PSAP personnel, central station personnel, or others having access to database 200 can select this button to request communications. When not available, one embodiment of the present system provides that this button disappears or appears in shaded form, thus indicating that the button is not available. When button 270 selected, one embodiment provides that communications are established with a caller that previously contacted PSAP 120. In various embodiments, the communications are directed to an agent, or principal, associated with the premises if the emergency event is a detected event using a security system component. In one embodiment, the selection of button 270 provides access to a further menu including a list of selectable persons with whom to attempt to contact. In one embodiment, failure to connect with a first choice is followed by an attempt to contact an auxiliary person.

In one embodiment, audio transducers coupled to a browser in a field response unit allow bidirectional communications to proceed using streaming audio and voice over data technology. In one embodiment, the communications includes an e-mail or pager message directed to a predetermined person. In various embodiments, communications include voice over IP (Internet Protocol) technology, digital simultaneous voice and data technology, or voice and data communications over a radio network. In one embodiment, a telephone coupled to the field response unit's browser provides communications. The communications can be bidirectional or unidirectional. In the examples enumerated above, the communications are bidirectional. One embodiment provides unidirectional communications. For example, unidirectional communications are provided with a particular type of sensor within a security system. For instance, with a security system having a glass breakage detector, ambient audio signals may be detectable and thus, if button 270 is selected, audible sounds at the premises are transmitted and played aloud on a speaker associated with the field service personnel over their browser or other software. In one embodiment, selection of button 270 activates a still, or video, camera at the location of the emergency event. An image captured by the camera is then displayed on a service provider's network communication device, or browser.

In one embodiment, the browser in the field response unit submits the request to establish communications. In one embodiment, the subsequent communications are conducted using network 140. In one embodiment, the subsequent communications are conducted using a communication channel other than that provided by network 140, such as, for example, a wired or wireless communication channel.

In one embodiment, actuation of button 270 transmits a pager signal for receipt by an authorized person. The authorized person is one having a controlling interest over the premises. In various embodiments, the pager signal is a one way pager signal or a two-way pager signal in which case, a response from the page signal recipient is requested. In one embodiment, a two-way pager signal requests that the recipient confirm the need for an emergency response to a detected event or it provide an opportunity for the recipient to cancel an emergency response that has already commenced.

View archival data button 275, when available, provides access to historical data relating to either the person, place, or thing associated with the emergency event. For example, in the case of a security system with a central station, the historical data includes data relative to the premise's owner, the premises street address, the security system installed, or other relevant parameter. In the case of a 9-1-1 telephone call, one embodiment provides that the historical data is associated with a particular telephone number, person, or street address.

Levy false alarm fine button 280 provides a field response unit 150, central station 160 or PSAP 120 with the ability to assert a monetary fine against a particular account. In various embodiments, the account is a caller's cellular telephone number or a subscriber's security system monitoring account. Some municipalities and central stations control and discourage false alarms by attempting to levy a fine against a subscriber.

View map button 285 provides a graphical map illustrating the emergency event 165. In one embodiment, the map represents a static location such as an address or site where a detected event has occurred. In one embodiment, the map illustrates movement of a vehicle, person, or other thing, in the manner previously described and the movement is denoted by movement of a graphical image on the screen of the browser. In one embodiment, the map includes textual or graphical data providing driving directions to facilitate timely arrival of emergency service personnel at the scene. In one embodiment, data from other sources is depicted graphically on the map image. For example, one embodiment provides that road construction data, roadway traffic volume data, speed limit data or other information is presented graphically to field response personnel to facilitate prompt arrival at an emergency scene.

Edit data fields button 290 enables a field response person, central station operator, or PSAP operator to manually or automatically edit data in selected fields of database 200. In one embodiment, the entry of data into the fields is by selection of menu options using a point-and-click technique. In one embodiment, the data is manually entered using a keyboard or other data entry means. Editing includes initial data entry, altering existing fields and deletion of data previously entered.

Matter disposition button 295 provides data that can be helpful in the later analysis and review of an emergency event. In one embodiment, selected people (for example, field personnel, central station personnel, PSAP personnel, or homeowner) have access to button 295 and when actuated, are able to view the disposition or outcome of a particular emergency event. In one embodiment, button 295 enables an editing function that allows editing, entry, or deletion of data, using predetermined data fields or menu options, or textual data entry. For example, one embodiment allows a homeowner to review the outcome of an alarm signal that may have occurred at a time when the homeowner was not present. In addition, others in the security service industry may derive valuable information from statistical analysis and study of historical data related to emergency responses. Other buttons are also contemplated. For example, the screen may include a button to control or operate a mechanical actuator. In one embodiment, a button controls a lock on an entry door. Actuation of the button toggles the lock from a locked to an unlocked position.

In one embodiment, the database is implemented using Extensible Markup Language (XML), developed by the World Wide Web Consortium (W3C). XML, a variant of HTML, allows system designers to create customized tags for defining, transmitting, validating and interpreting data between different applications and organizations. Using XML, for example, central station 160 can post a website indicating that a burglary is in process, and later, a police officer using a wireless browser, can upload data to the website providing a description of the getaway car. In this example, additional data is posted to the website using customized tags. The database application running on a processor at central station 160 need not be compatible with the browser software executing on the processor used by the police officer.

Figure 4:
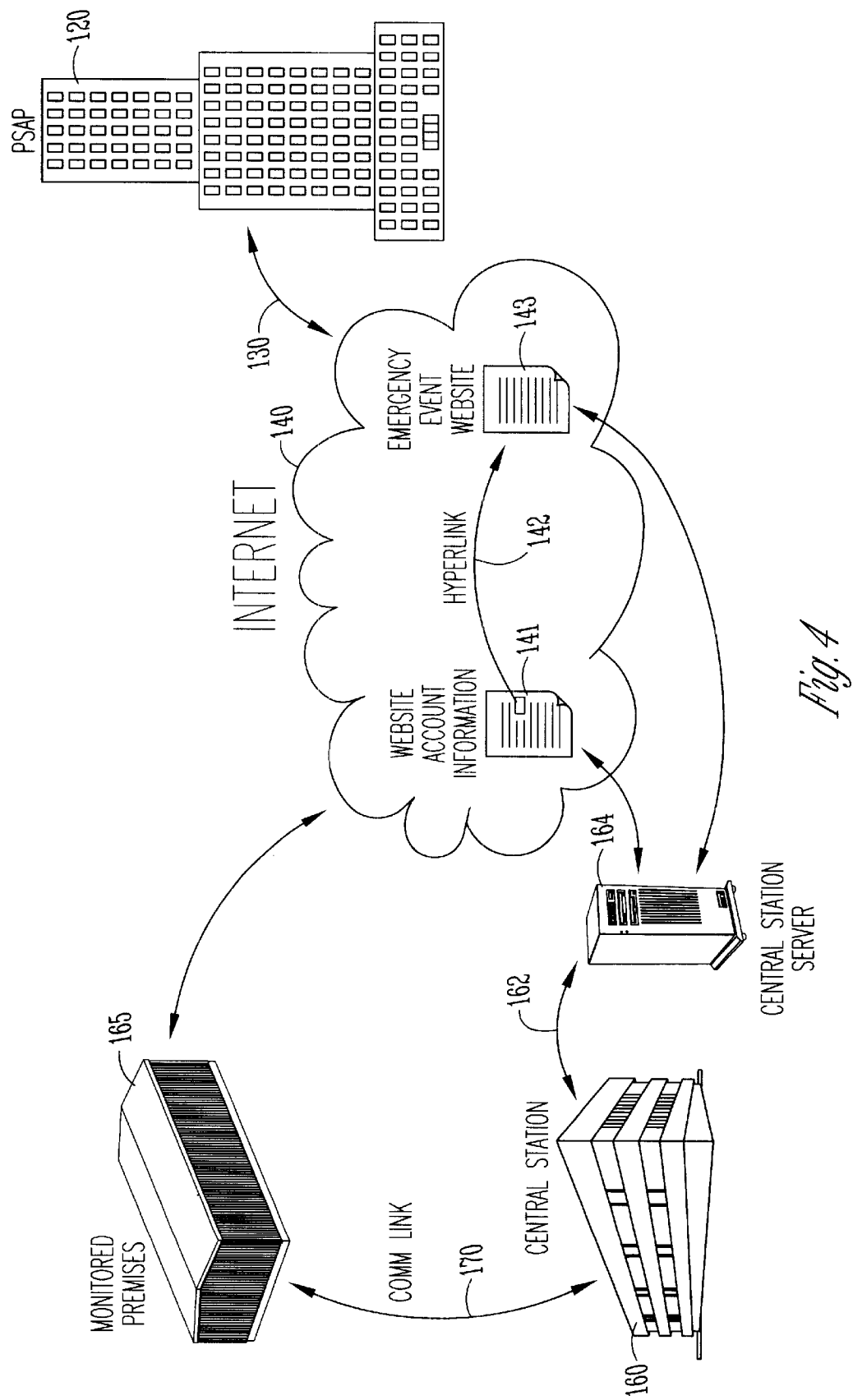
FIG. 4 illustrates networked communications using linked pages in accordance with one embodiment of the present system.

FIG. 4 illustrates one embodiment of the present subject matter. In the embodiment shown, central station 160 includes server 164. In one embodiment, server 164 includes the database generated by the telecommunication operators of station 160. Server 164, linked to central station 160 by communication link 162, provides hosting services for database 200. In the embodiment shown, web page 141, having a particular URL address, displays the content of database 200. For example, in one embodiment, page 141 includes subscriber account information. In one embodiment, page 141 also includes hyperlink 142, which, when selected, causes the browser to display the content of web page 143. In one embodiment, web page 143 provides additional information, such as for example, a real time video depiction or graphical illustration of a building layout. In one embodiment, access to the web pages posted by server 164 requires entry of a valid password, or key. In various embodiments, holders of valid passwords, or keys, include the homeowner (or subscriber), selected PSAP personnel, or others.

A homeowner or subscriber may choose to access the web page in order to assess the outcome of a particular emergency call. For example, data available at the web page may show indicate the response time before arrival of the police or fire department. Such information may also be valuable for municipalities in evaluating the adequacy of their emergency services. Other information may be made available to the homeowner, including notes from a responding police officer.

Other applications of the present system are also contemplated. In addition to alarm services, one embodiment of the present system facilitates card access systems. For example, in one embodiment, an attempt to gain access to a secure area triggers the creation and posting of an encrypted database on a network. Those having security to view the database, using the network, are then able to view the database and arrest movement within the secured area, using a wired, or wireless, communication channel to operate electromechanical equipment and actuators.

In one embodiment, medical or health information is provided to emergency service providers using the present system. Many facilities or institutions maintain medical or health information for participants. For example, elderly care residences, managed care facilities and a medical care facilities typically maintain a database reflecting individual patient health or medical information. Also, penal institutions often maintain health records for inmates. In one embodiment of the present system, data maintained by such institutions can be merged with data corresponding to an emergency event and disseminated using a network. Responding service providers are then able to access the medical history and provide care tailored to the individual needs of the patient.

In one embodiment, the database of information is updated as new information is received. Multiple sensors or detectors in a security system can provide updated information during the course of an emergency event at a protected premises. The updated information may enable a more efficiently targeted response to the emergency event. Also, as additional information concerning an unmonitored event is received, the information can be posted on the network for the benefit of service providers. Real time updates of information posted to the network ensures that field response personnel have as much information as possible with which to tailor their response.

In one embodiment of the present system, the homeowner, or subscriber provides a verification signal to indicate that the emergency signal corresponds to a genuine emergency and not a false alarm. Security alarms signals are often associated with false alarms. By providing homeowner verification with the alarm signal, it is believed that emergency personnel will provide better emergency response services. In one embodiment, the website also includes contact information to allow a responding party to immediately establish communication with the homeowner. For example, the website may include a hyperlink button to talk with the homeowner using the Internet. Emergency personnel may communicate with the homeowner and receive information that can further assist in tailoring a suitable response to the emergency situation. By way of example, the homeowner may be able to provide information as to the contents of a building to fire department personnel.

Various means of verifying an alarm signal are contemplated, including those illustrated in FIGS. 5A–5E. In FIGS. 5A–5E, sensor 590 may be an individual security sensor or it may be a complete security system. In addition, sensor 590 may be a smoke detector, fire detector, or other sensor of danger that threatens property or humans. Homeowner 580 may be a property owner, landlord, tenant, or other person authorized to take action with respect to the particular premises monitored by sensor 590 or otherwise empowered to confirm or deny an emergency condition.

Figure 5A:
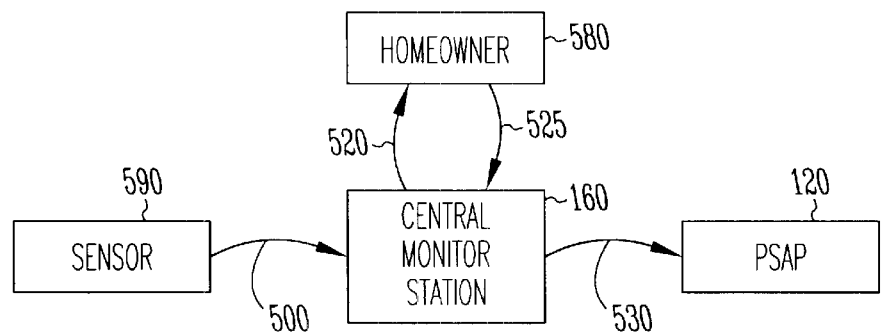
FIGS. 5A–5E illustrate various configurations for confirming an alarm signal in accordance with one embodiment of the present system.

At FIG. 5A, alarm signal 500 from sensor 590 is directed to central monitor station 160. Central monitor station 160 then sends message 520 to homeowner 580 (or other responsible party) along with a request for a reply. Reply 525 from homeowner 580 may include a confirmation of the alarm, denial of the alarm, or it may include additional information or particular instructions. Reply 525 is received by central monitor station 160, and where appropriate, emergency services are dispatched using PSAP 120 in accordance with information, or instructions, received from homeowner 580. PSAP 120 receives the request for dispatch on link 530.

Figure 5B:
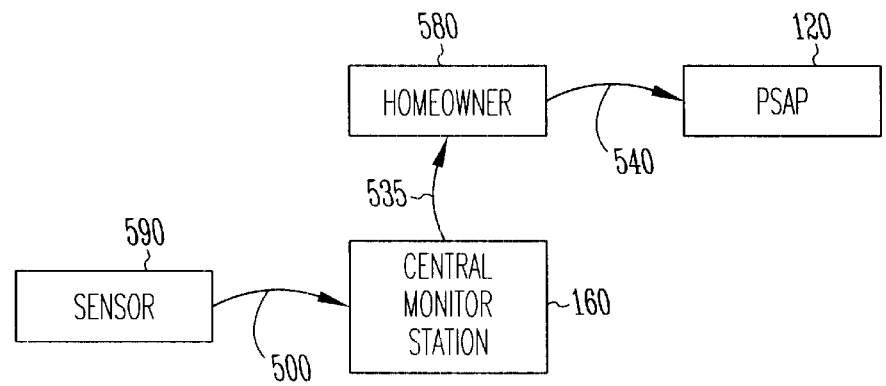

At FIG. 5B, alarm signal 500 is sent to central monitor station 160 which then bundles appropriate dispatch information with the alarm signal and forwards message 535 to homeowner 580. Rather than replying to central monitor station 160, homeowner 580 confirms the emergency by forwarding the dispatch information directly to PSAP 120 for further processing using link 540.

Figure 5C:
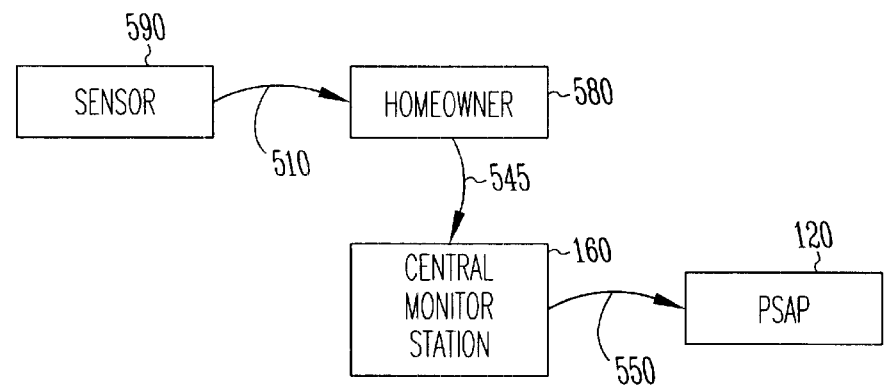

At FIG. 5C, alarm signal 510 is sent to homeowner 580 before delivery to central monitor station 160. Homeowner 580 confirms the alarm signal by the act of forwarding the signal to central monitor station 160 using link 545. Homeowner 580 may forward additional information as well. Central monitor station 160, after having received the signal, then arranges the dispatch of emergency services by contacting PSAP 120 using link 550.

Figure 5D:
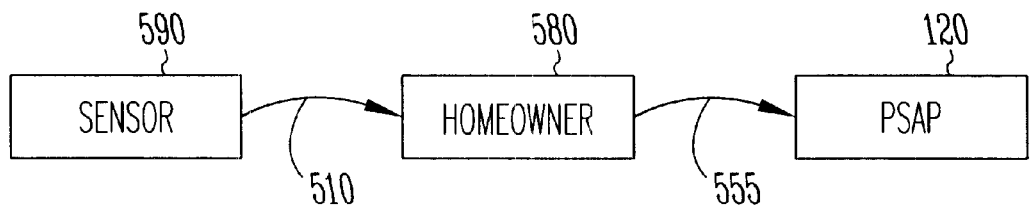

At FIG. 5D, alarm signal 510 is directed to homeowner 580 and then forwarded, if confirmed, to a dispatch service, such as PSAP 120 using link 555. In this embodiment, the central monitor station is omitted.

Figure 5E:
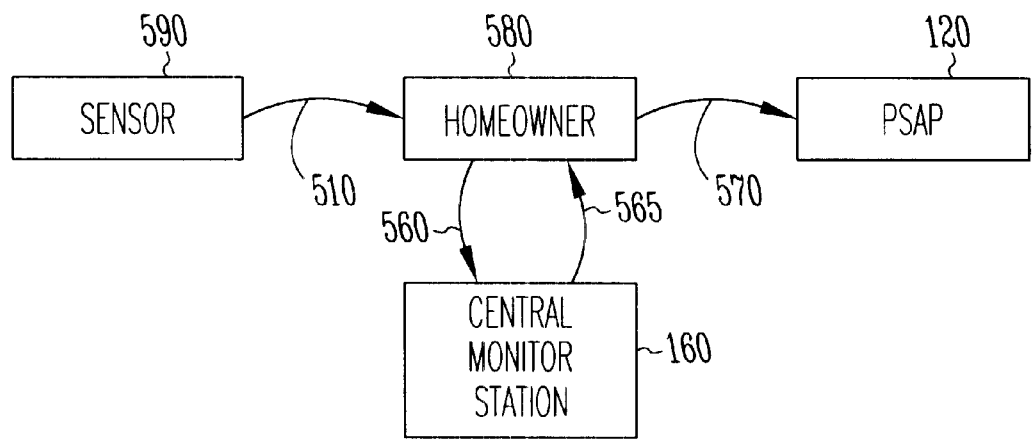

At FIG. 5E, alarm signal 510 is sent to homeowner 580 and if confirmed by homeowner 580, to central monitor station 160 using link 560. Central monitor station 160 replies to homeowner 580 with appropriate dispatch information using link 565. Homeowner 580 then forwards the alarm signal and dispatch information received from central monitor station 160 to PSAP 120 or other service.

In one embodiment, homeowner 580, or other responsible user or party, receives an e-mail message including a request for confirmation of an alarm signal. The message provides one or more user selectable hyperlinks or control buttons. The user is prompted with a question and given an opportunity to select a button, or hyperlink, with which to respond. In one embodiment, the buttons are labeled "confirm" and "deny" and the question calls for the user to authenticate an alarm signal. If the user selects the "confirm" button, then parties responding to the emergency, or alarm, can proceed with confidence that it is unlikely to be a false alarm. Furthermore, the responding party may opt to select a button appearing on their screen which submits a request to engage in bidirectional communications with the user.

In one embodiment, video information is presented using the website. The output signal of a video camera at the emergency site is coupled to a communication network. The video is captured, or streamed, from the network to the website accessible to a responding party.

In addition to those presented in FIGS. 5A–5E, various other combinations of messages and signal routing are also contemplated. In the foregoing examples, the alarm signal, message, or the reply, may be transmitted using wired or wireless systems. For example, the alarm signal may be transmitted from the security sensor to the central station using a public switched telephone network and the message to the homeowner may use a wireless two-way pager or cellular telephone protocol. In addition, the communication between the PSAP and the central station may proceed using one communication protocol and the communication between the PSAP and a police officer, or other responding party, may use a second communication protocol.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention.

What is claimed is:

1. A method of communicating comprising:
   receiving an emergency request for aid;
   generating a collection of information based on the emergency request;
   generating a secure website including the collection of information, the website having an Internet address;
   providing notification of the emergency request to a first user; and
   authorizing the first user to access the secure website.

2. The method of claim 1 wherein authorizing the first user to access the secure website includes providing a password to the particular user.

3. The method of claim 1 wherein receiving an emergency request for aid includes receiving a signal from a security sensor.

4. The method of claim 1 wherein receiving an emergency request for aid includes receiving geographic location information.

5. The method of claim 1 wherein receiving an emergency request for aid includes receiving a telephone call.

6. The method of claim 1 wherein receiving an emergency request for aid includes receiving a wireless request.

7. The method of claim 1 further comprising presenting a selectable option to the first user whereby selection of the option transmits a request to establish bidirectional communications.

8. The method of claim 1 further comprising presenting a selectable option to the first user whereby selection of the option transmits a request to receive real-time communications from a sensor associated with the emergency request for aid.

9. The method of claim 1 further comprising presenting a selectable option to the first user whereby selection of the option levies a monetary charge against a first account associated with the emergency request for aid.

10. The method of claim 1 further comprising presenting a selectable option to the first user whereby selection of the option enables access to textual notes concerning the request for aid.

11. The method of claim 1 wherein providing access to the website includes sending a wireless message to the first user, the wireless message including the Internet address.

12. The method of claim 1 wherein providing notification of the emergency request to a first user includes sending an e-mail message to the first user, the message including the Internet address and a request for acknowledgment of receipt of the e-mail message.

13. The method of claim 1 further comprising:

providing notification of the emergency request to a second user; and authorizing the second user to access the secure website.

14. The method of claim 13 wherein providing notification of the emergency request to a second user includes sending the Internet address from the first user to the second user.

15. An apparatus comprising:

an input interface coupled to a first communication network and adapted for receiving an emergency call;

a processor coupled to the input interface and adapted for converting the emergency call into website data and adapted for applying access control to the website data;

an Internet connection coupled to the processor and adapted for distribution of the website data on a digital network; and an output interface coupled to a second communication network and adapted for transmitting notification of receipt of the emergency call and for granting access authorization to a predetermined user.

16. The apparatus of claim 15 wherein the input interface includes a telephone.

17. The apparatus of claim 15 wherein the output interface includes a telephone.

18. The apparatus of claim 15 wherein the output interface includes a radio transceiver.

19. The apparatus of claim 15 wherein the output interface includes an e-mail program.

20. The apparatus of claim 15 further comprising a bidirectional communication channel coupled to the Internet connection and adapted for enabling bidirectional communication between the predetermined user and a responsible party.

21. The apparatus of claim 20 wherein the bidirectional communication channel is adapted for audio communication.

22. The apparatus of claim 20 wherein the bidirectional communication channel is adapted for video communication.

23. The apparatus of claim 20 further comprising an encryption program executing on the processor and wherein applying access control includes applying key encryption.

24. A communication system comprising:

a security sensor adapted for detecting an emergency event and providing an electrical signal in response thereto;

a processor coupled to the sensor and adapted for receiving the electrical signal and for generating encrypted data corresponding to the emergency event, the data accessible at an address on a digital network; and a transmitter coupled to the processor and coupled to a communication network, the transmitter adapted for providing notification of the emergency event to an emergency response facility using the communication network and adapted for providing a decryption key to the emergency response facility.

25. The system of claim 24 wherein the security sensor includes a microphone.

26. The system of claim 24 wherein the security sensor includes a camera.

27. The system of claim 24 wherein the security sensor includes a motion sensor.

28. The system of claim 24 further comprising an intercom coupled to the processor, the intercom adapted for bidirectional communication between the emergency response facility and a person near the intercom.

29. The system of claim 24 wherein the digital network includes the Internet.

30. A browser system comprising:

an interface wirelessly coupled to a digital network and communicating real time emergency information corresponding to an emergency event using a secure communication channel;

a processor coupled to the interface;

a display coupled to the processor and adapted for depicting data received on the secure communication channel; and a program executing on the processor and adapted for providing notification of the emergency event to a user and adapted for displaying the real time emergency information to the user.

31. The system of claim 30 wherein the digital network includes the Internet.

32. The system of claim 30 further comprising a user selectable button whereby actuation of the button transmits a request to establish bidirectional communication using the digital network.

33. The system of claim 30 further comprising a user selectable button whereby actuation of the button transmits a request to establish bidirectional communication with a public safety answering point using the digital network.

* * * * *